United States Patent [19]

Altenpohl et al.

[11] 4,317,258
[45] Mar. 2, 1982

[54] SIDE SUSPENSION CONVEYOR SYSTEM FOR POULTRY

[75] Inventors: William F. Altenpohl; Paul J. Altenpohl, both of High Point, N.C.

[73] Assignee: W. F. Altenpohl, Inc., High Point, N.C.

[21] Appl. No.: 158,922

[22] Filed: Jun. 12, 1980

[51] Int. Cl.³ .................... A22B 5/00; A22C 21/00
[52] U.S. Cl. ............................................ 17/24; 17/11; 17/44.1
[58] Field of Search ............... 17/44, 44.1, 44.2, 24; 104/111, 91, 106

[56] References Cited

U.S. PATENT DOCUMENTS

| 2,612,265 | 9/1952 | Altenpohl | 17/44.1 X |
| 3,781,946 | 1/1974 | Altenpohl | 17/44.1 |
| 4,094,413 | 6/1978 | Altenpohl | 17/44.1 X |

Primary Examiner—Willie G. Abercrombie
Attorney, Agent, or Firm—Harvey B. Jacobson

[57] ABSTRACT

Poultry carriers connected to a common overhead conveyor, travel along a pair of load supporting tracks through a weighing station. The tracks are laterally spaced from each other below the conveyor to reduce spacing between adjacent carriers in the direction of conveyor travel. Each carrier is supported on a track by a roller assembly having a single roller shaft from which the carrier is pivotally suspended by a side suspension arm rigidly connected to one axial end of the roller shaft.

20 Claims, 7 Drawing Figures

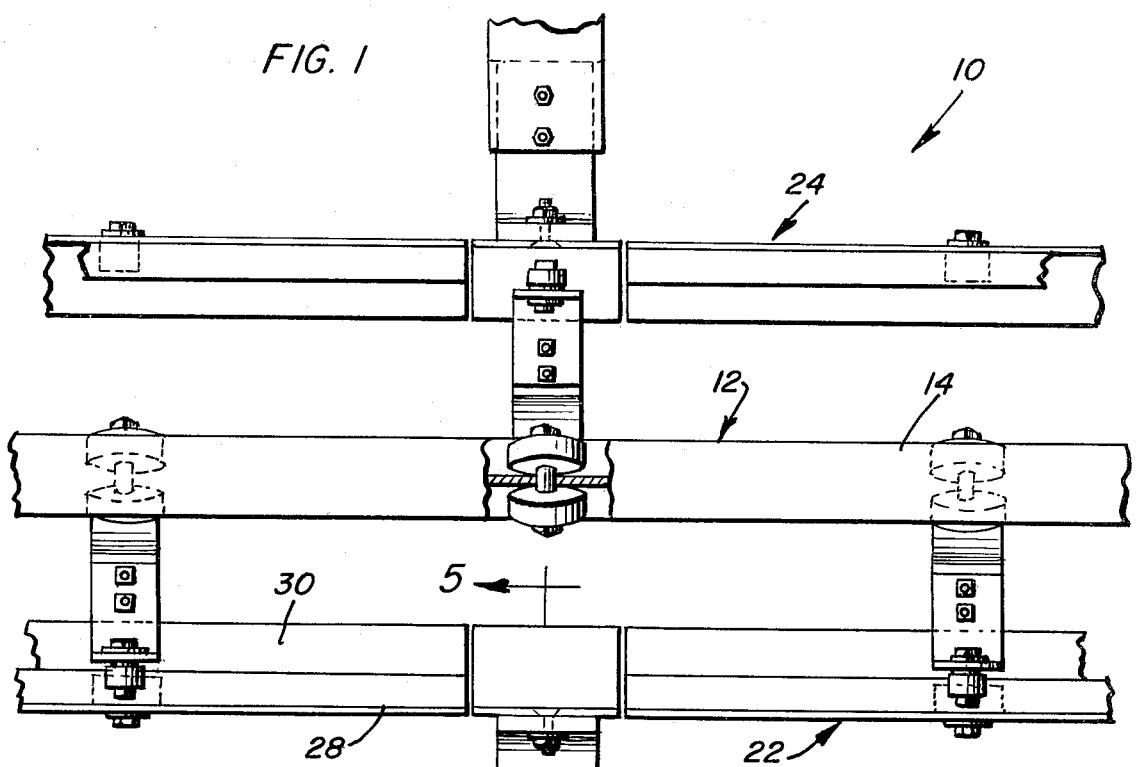
FIG. 1
FIG. 7
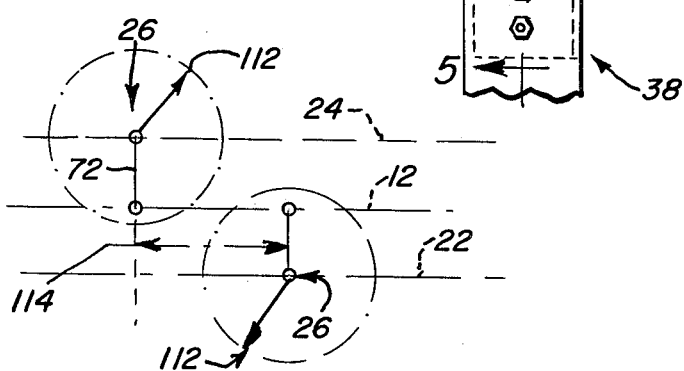
FIG. 5
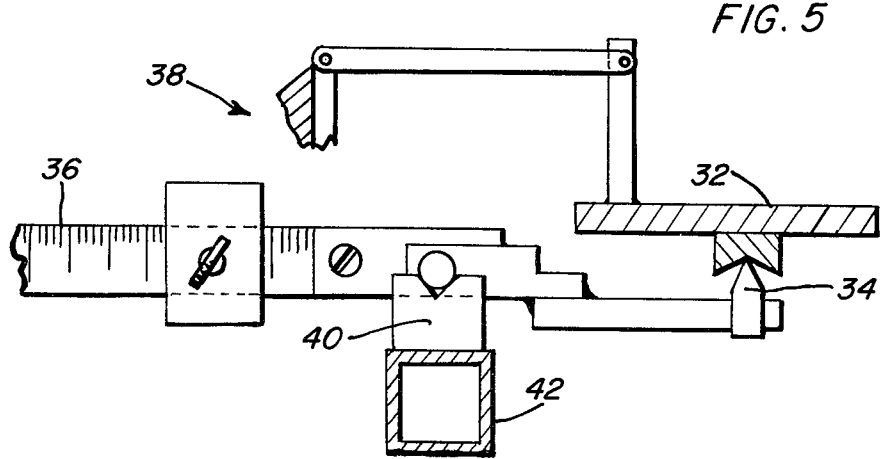

4,317,258

SIDE SUSPENSION CONVEYOR SYSTEM FOR POULTRY

BACKGROUND OF THE INVENTION

This invention relates to a poultry conveyor system having a plurality of vertically elongated poultry carriers pivotally suspended from an overhead conveyor for travel along a conveyor path through at least one station at which the carriers are supported by rollers on a load supporting track parallel to the conveyor path.

Conveyor systems of the foregoing type are already well-known as disclosed for example in U.S. Pat. Nos. 3,291,303 and 3,781,946. In such conveyor systems, a necessary measure of lateral stability is provided for the load carriers during travel through a weighing station, by use of laterally spaced rollers on a single roller shaft riding on a split type track accommodating pivotal suspension of each load carrier from a location on its roller shaft between the rollers. Use of a single roller shaft from which each load carrier is suspended as compared to longitudinally spaced roller shafts, enables closer spacing between load carriers along the conveyor path of travel. It will be appreciated that production flow rate, or conveyor speed, will depend on the spacing of the load carriers along the conveyor chain from which the load carriers are pivotally suspended by pulling links connected to the roller shafts. Thus, production flow rate or conveyor speed is increased by decreasing the spacing between load carriers to a minimum which is dependant on poultry dimensions.

It is therefore an important object of the present invention to provide a single poultry conveyor line of the foregoing type in which either a further increase in production flow rate is achieved without any increase in conveyor speed or a reduction in conveyor speed is achieved without any reduction in production flow rate.

SUMMARY OF THE INVENTION

In accordance with the present invention, a pair of parallel spaced, load supporting tracks are mounted below a single overhead conveyor line, on either side of the conveyor line and laterally spaced from each other by an amount less than that ordinarily dictated by the maximum dimension of the poultry being handled. The poultry products are suspended on vertically elongated carriers in overlying relation to both load supporting tracks by means of pulling arms extending laterally from the conveyor chain. The spacing between adjacent pulling arms which extend laterally in opposite directions from the conveyor chain, is also less than that ordinarily dictated by maximum poultry product dimension, in the direction of travel, in view of the suspension of adjacent poultry products in laterally spaced relation to each other relative to the direction of conveyor travel. Pulling links pivotally interconnect each lateral pulling arm with a poultry carrier in overlying relation to the load supporting tracks, through a single roller bearing shaft to which the pulling link is connected between a pair of rollers supporting the carrier on the load supporting track during travel through a weighing station.

The poultry carriers are pivotally suspended by means of side suspension arms rigidly connected to the confronting axial ends of the roller bearing shafts traveling along the parallel spaced load supporting tracks. In this manner, use of split tracks are avoided even though two rollers for each roller bearing shaft is utilized. Lateral stability is assured despite the use of lateral loading of the conveyor chain, by guide rollers mounted on the pulling arms for rolling engagement with a guide track fixed in parallel spaced relation to each load supporting track. A gravitational biasing device yieldably engages the guide rollers to hold them down in contact with the guide track during travel of the poultry carrier across the scale platform associated with weighing scale beams extending at right angles to the conveyor and tracks. Thus, any tendency of the conveyor chain to be laterally tilted by uneven lateral loading is resisted in order to prevent introduction of error to the weighing operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 1 is a partial top plan view of a poultry conveyor system at a weighing station.

FIG. 5 is an enlarged partial section view taken substantially through a plane indicated by section line 5—5 in FIG. 1.

FIG. 7 is a diagrammatic illustrating depicting the geometry associated with the arrangement of FIG. 1.

DETAILED DESCRIPTION OF PREFERRED EMBODIMENT

Figure 2:
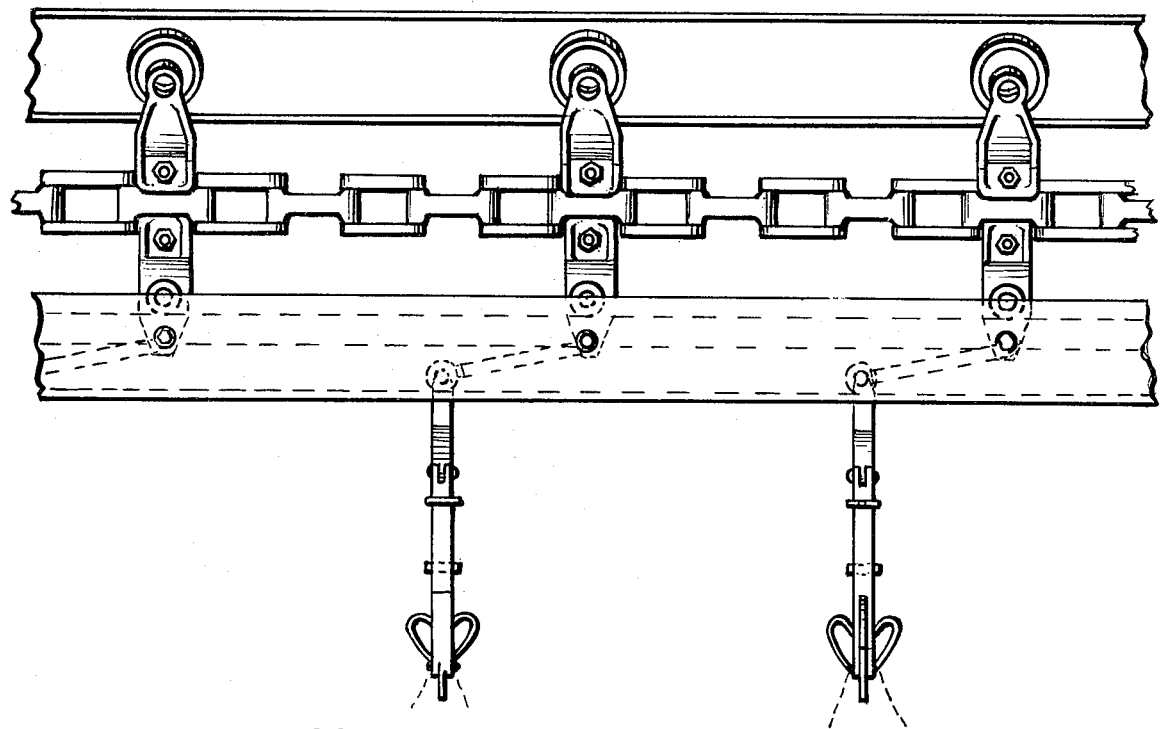
FIG. 2 is a side elevation view of the installation shown in FIG. 1.

Referring now to the drawings in detail, FIGS. 1 and 2 illustrate a portion of a poultry conveyor system generally referred to by reference numeral 10, extending through a poultry weighing station. The conveyor system includes a single overhead conveyor, generally referred to by reference numeral 12, which includes a fixedly mounted, I-beam track 14 on which trolley arms 16 are supported by rollers 18. The trolley arms are interconnected with links 20 of a conveyor chain 22 spaced below the I-beam track 14. Thus, loads such as the poultry products suspended from the trolley arms 16 are caused to travel along a predetermined conveyor path in a manner well known in the art.

The single line conveyor 12, as shown in FIGS. 1 and 2, is associated with a pair of parallel spaced, load supporting tracks 22 and 24 along which load carriers 26 are conveyed through a double weighing station. Each load supporting track is fixedly mounted in spaced relation below the conveyor 12 and laterally spaced therefrom, as more clearly shown in FIGS. 1 and 3. Each load supporting track includes a vertical mounting flange 28 and a horizontal, uninterrupted track surface portion 30. The horizontal track surface portions 30 of the two load supporting tracks 22 and 24 extend laterally toward each other equally spaced from the conveyor. Each load supporting track includes a vertically movable platform section 32 occupying a gap in the fixed horizontal surface portion 30 of the track. Each platform section 32 when loaded transmits a force through a fulcrum element 34 to a scale beam 36 of a weighing device 38, as more clearly seen in FIG. 5. The scale beam 36 is pivotally supported on a fulcrum block 40 fixedly mounted on a support frame 42. The scale beams 36 of the two weighing devices extend perpendicular to the direction of conveyor travel and in opposite lateral directions away from the conveyor 12. Although the two weighing devices are aligned with each other, as shown in FIG. 1, they need not be so aligned and may be located at any desired position independently of each other, with their associated platform sections 32 being correspondingly positioned along the load supporting tracks 22 and 24.

Figure 3:
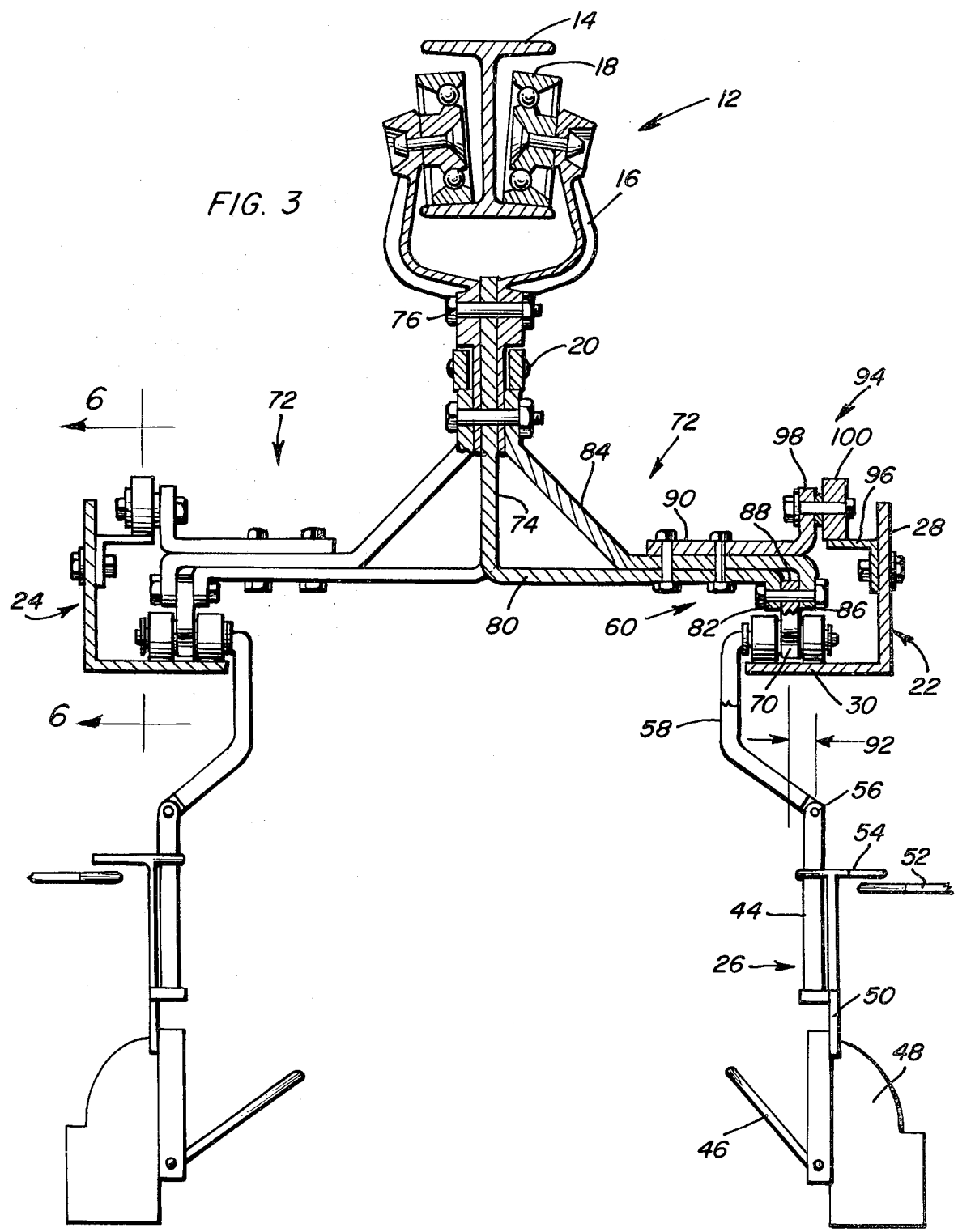
FIG. 3 is a transverse section view taken substantially through a plane indicated by section line 3—3 in FIG. 2.

As more clearly seen in FIG. 3, each of the poultry carriers 26 is of the well-known "Altenpohl" type having a vertically elongated, rod-like body or post 44 pivotally mounting adjacent its lower end a poultry hook 46 to which a counterweight 48 is connected. A latch 50 is slidably mounted on the body 44 and is gravitationally biased to its lower latching position holding the poultry hook in its upwardly inclined position. As is well-known in the art, upward displacement of the latch 50 by a signal operated actuator 52 engaging a release arm 54 at the upper end of the latch, permits the poultry hook to be pivoted downwardly under load for release of the poultry product. The upper end of the carrier body 44 is connected by a pivot 56 to the lower end of a side suspension arm 58 by means of which the carrier 26 is pivotally suspended from a roller assembly 60 supported on a load supporting track 22 or 24 during travel of the carrier through the weighing station. the side suspension arms 58 extend from the confronting axial ends of laterally spaced roller assemblies 60 respectively aligned with the parallel spaced tracks 22 and 24.

Figure 4:
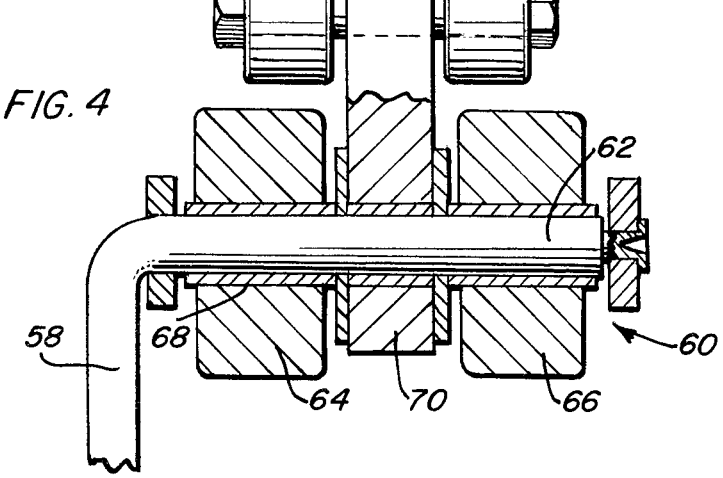
FIG. 4 is a further enlarged section view of a portion of the apparatus shown in FIG. 3.

As more clearly seen in FIG. 4, each of the roller assemblies 60 includes a single roller bearing shaft 62 having one axial end to which a side suspension arm 58 is rigidly connected. A pair of laterally spaced rollers 64 and 66 are rotatably mounted on the bearing shaft 62 by means of sleeve bearings 68, for example. Connected to the bearing shaft between the rollers 64 and 66 is a pulling link 70 by means of which the roller assembly is interconnected with the conveyor chain 22.

As more clearly seen in FIG. 3, each roller assembly is interconnected through a pulling link 70 with the conveyor chain by means of a laterally extending pulling arm assembly 72, the lateral ends of which overlie the tracks 22 and 24. In accordance with one embodiment of the invention, each of the lateral pulling arms includes a vertical connecting portion 74 that is sandwiched between the trolley arms 16 and the links 20 and secured thereto by fasteners 76 and 78. Horizontal arm portions 80 extend laterally from the vertical connecting portions 74 and terminate at flanged ends 82 overlying the load supporting tracks. A bracing arm portion 84 associated with each pulling arm assembly is interconnected with the lower ends of each trolley arm 16 by means of the fastener 78 and terminates at flanged end 86 closely spaced from the flanged end 82 of the arm portion 84. The pulling link 70 is pivotally interconnected with the terminal ends 82 and 86 of the lateral pulling arm assembly 72 by means of pivot bolt 88. The portions 80 and 84 of each pulling arm assembly are interconnected with each other by means of fastener assemblies 90.

It will be noted from FIG. 1, adjacent pulling arm assemblies 72 longitudinally spaced along the conveyor 12 extend laterally therefrom in opposite directions so as to be connected to load carriers 26 underlying the parallel spaced load supporting tracks 22 and 24. As shown in FIG. 3, the longitudinal axes of the load carriers 26 are slightly offset by an amount 92 from its pulling link 70 to which the load carrier is pivotally connected by the side suspension arm 58. The geometry of the foregoing arrangement has been found to provide good lateral stability for the conveyor chain when the carriers 26 are loaded by poultry products. However, because of load variations, some lateral instability is unavoidable which could adversely affect the product weighing operation. In order to overcome the lateral instability problem, each of the load supporting tracks 22 and 24 has guide means associated therewith and generally referred to by reference numeral 94, as more clearly seen in FIGS. 3 and 6.

Figure 6:
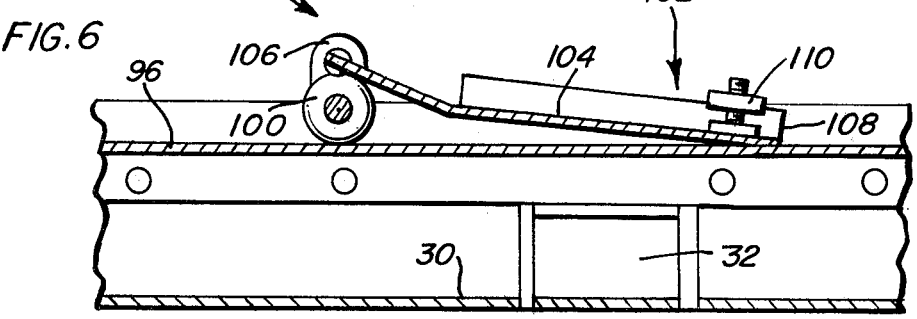
FIG. 6 is an enlarged partial section view taken substantially through a plane indicated by section line 6—6 in FIG. 3.

The guide means 94 includes a guide track 96 secured to the vertical mounting flange 28 of each load supporting track and vertically spaced above the horizontal track surface portion 30 in parallel relation thereto. A guide arm 98 is connected to each lateral pulling arm assembly 72 by the fasteners 90 and supports a guide roller 100 for rolling contact with the guide track 96. Accordingly, downward tilting of the pulling arm assemblies will be prevented and thereby constrain movement of the roller assembly 60 to the tracks 22 and 24 during the weighing operation. To insure accurate weighing, upward tilt of the lateral pulling arm assemblies caused by momentary loading, for example, is prevented during travel of each roller assembly across a scale platform section 32, by means of a gravitational biasing device generally referred to by reference numeral 102, as shown in FIG. 6.

The biasing device 102 includes a pivoted arm 104 pivotally mounted on the track by a pivot bracket 106 located close to and in advance of the platform section 32 in the direction of conveyor travel. Thus, the pivoted arm 104 will rest on the guide track at its forward end 108 as shown in FIG. 6. As the pulling arm assembly and the carrier suspending roller assembly 60 approach the platform section 32, the guide roller 100 engages the pivoted arm 104 to displace it upwardly and is thereby yieldably held in contact with the guide track 96. The gravitational bias of device 102 is removed after the roller assembly returns to a fixed portion 30 of the load supporting track. An adjustable weight element 110 is mounted on the pivoted arm 104 adjacent the end 108 in order to provide an adjusted downward gravitational bias, exerted on the guide roller to hold it in contact with the guide track 96. Thus, an accurate weighing operation is achieved despite the lateral loading problem created by the arrangement of the present invention.

The lateral spacing of the load supporting tracks 22 and 24 from the conveyor line 12 should be as small as possible to minimize lateral instability and in accordance with the present invention such spacing may be less than that ordinarily dictated by the maximum dimension 112 of the poultry product 114 as diagramatically shown in FIG. 7. No interference between adjacent poultry products occurs because of the suspension of alternate load carriers 26 on opposite lateral sides of the common conveyor 12. Further, it will be apparent from FIG. 7 that the longitudinal spacing 116 between adjacent load carriers along the conveyor line may be less than what would otherwise be the minimum interference-free spacing, because of the geometry involved.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a conveyor, a load supporting track spaced therebelow and a vertically elongated load carrier, a bearing shaft having opposite axial ends, a pulling link pivotally connecting the conveyor to said bearing shaft intermediate the axial ends thereof, roller means mounted on said bearing shaft for rolling contact with said track, and suspension means connected to one of said axial ends of the bearing shaft for pivotally suspending the load carrier from the bearing shaft in laterally spaced relation to the conveyor relative to conveyor travel direction.

2. The combination of claim 1 wherein said suspension means comprises a side suspension arm rigidly connected to said one of the axial ends of the bearing shaft laterally of the track and means pivotally connecting the load carrier to the side suspension arm in spaced relation below the track.

3. The combination of claim 2 wherein said track presents an uninterrupted support surface laterally spaced from the conveyor along which the roller means is guided.

4. The combination of claim 3 wherein said roller means comprises two rollers mounted in the bearing shaft on opposite axial sides of the pulling link.

5. The combination of claim 4 including a laterally extending pulling arm connecting the conveyor to the pulling link.

6. The combination of claim 1 wherein said track presents an uninterrupted support surface laterally spaced from the conveyor along which the roller means is guided.

7. The combination of claim 6 including a laterally extending pulling arm connecting the conveyor to the pulling link.

8. The combination of claim 6 wherein said roller means comprises two rollers mounted in the bearing shaft on opposite axial sides of the pulling link.

9. The combination of claim 1 including a laterally extending pulling arm connecting the conveyor to the pulling link.

10. The combination of claim 9 including guide means connected to the pulling arm for substantially constraining movement of the pulling arm parallel to said track.

11. The combination of claim 10 wherein said guide means includes a guide track mounted in fixed parallel spaced relation to the load supporting track, and a guide roller mounted on said pulling arm in rolling contact with said guide track.

12. The combination of claim 11 wherein said guide means further includes biasing means for yieldably holding the guide roller in engagement with said guide track during travel of the pulling arm parallel to said track.

13. The combination of claim 12 wherein said load supporting track includes a vertically movable platform section, and fixed sections substantially bridged by said platform section, said biasing means being operative on the guide roller during travel of roller means over the vertically movable platform section of the load support track.

14. In combination, a pair of parallel spaced, load supporting tracks, a common conveyor mounted parallel to, laterally between and above said tracks, a plurality of vertically elongated load carriers and means connecting said load carriers to the conveyor for travel along both of said tracks including a plurality of pulling arms connected in longitudinally spaced relation to said conveyor, alternate ones of the pulling arms extending laterally in opposite directions from the conveyor into overlying relation to the tracks, roller means movable along said tracks, means for suspending said load carriers from the roller means and pulling links interconnecting each of the pulling arms to the roller means.

15. The combination of claim 14 wherein said suspending means includes side suspension arms extending laterally toward each other from the roller means.

16. The combination of claim 15 wherein each of said roller means includes a bearing shaft and spaced rollers mounted on said bearing shaft, said pulling links being pivotally connected to the bearing shafts axially between the spaced rollers thereon, the bearing shafts of the respective roller means on the spaced tracks having confronting ends to which the suspending means are rigidly connected.

17. The combination of claim 14 wherein each of said roller means includes a bearing shaft and spaced rollers mounted on said bearing shaft, said pulling links being pivotally connected to the bearing shafts axially between the spaced rollers thereon, the bearing shafts of the respective roller means on the spaced tracks having confronting ends to which the suspending means are rigidly connected.

18. The combination of claim 14 wherein said load carriers are adapted to suspend poultry therefrom for travel along a path established by the conveyor.

19. The combination of claim 14 including a guide track mounted in fixed parallel spaced relation to each of the load supporting tracks, a guide roller mounted on each of the pulling arms and engageable with said guide track, and biasing means for yieldingly holding the guide rollers in engagement with the guide tracks.

20. The combination of claim 19 wherein each of said load supporting tracks includes a vertically movable track section and fixed track sections, said biasing means being operative on the guide rollers during travel of the roller means over the vertically movable track sections.

* * * * *